United States Patent [19]

Schuhbauer

[11] Patent Number: 4,939,878
[45] Date of Patent: Jul. 10, 1990

[54] PROCESS FOR SEALING STRUCTURAL BODIES OR CAVITY-DEFINING WALLS WHICH MAY BE SUBJECT TO CRACKING

[75] Inventor: Alfred Schuhbauer, Hochstadt, Fed. Rep. of Germany

[73] Assignee: Alfred Kunz GmbH & Co., Munchen, Fed. Rep. of Germany

[21] Appl. No.: 299,370

[22] Filed: Jan. 23, 1989

[30] Foreign Application Priority Data

Jan. 25, 1988 [DE] Fed. Rep. of Germany ....... 3802086

[51] Int. Cl.$^5$ .................. E04B 1/346; E04B 1/66
[52] U.S. Cl. .................. 52/169.14; 220/422; 220/426; 264/261; 405/52
[58] Field of Search ............. 52/169.14, 249, 408; 405/52, 53, 128; 220/1 B, 5 A, 422, 426; 264/261, 327

[56] References Cited

U.S. PATENT DOCUMENTS

| 373,946 | 11/1887 | Richardson | 52/169.14 X |
|---|---|---|---|
| 2,382,171 | 8/1945 | Pomykala | 405/53 X |
| 3,136,135 | 6/1964 | Rigby | 405/53 X |
| 3,319,430 | 5/1967 | Small | 220/426 X |
| 3,338,010 | 8/1967 | Waugh | 52/249 |
| 3,559,835 | 2/1971 | Lange | 220/422 |
| 3,852,973 | 12/1974 | Marothy | 220/422 X |
| 3,925,992 | 12/1975 | Backstrom | 405/53 |
| 4,136,493 | 1/1979 | Bradford et al. | 52/249 X |
| 4,464,081 | 8/1984 | Hillier et al. | 405/53 X |
| 4,483,790 | 11/1984 | Gaiser . | |
| 4,561,292 | 12/1985 | Pugnale et al. | 220/426 X |
| 4,580,925 | 4/1986 | Matich et al. | 405/52 X |

FOREIGN PATENT DOCUMENTS 8103516 12/1981 European Pat. Off. ......... 52/169.14

Primary Examiner—Richard E. Chilcot, Jr.
Attorney, Agent, or Firm—Fleit, Jacobson, Cohn, Price, Holman & Stern

[57] ABSTRACT

In a method of sealing structural bodies or cavity-defining walls which may be subject to cracking, a sealing material is applied to the outside surface of the bodies or walls, the body or the cavity-defining walls are surrounded or enclosed by enclosing walls which are spaced from the body or the cavity-defining walls and a flowable sealing fluid having a high viscosity is introduced into the space thus formed.

13 Claims, 1 Drawing Sheet

PROCESS FOR SEALING STRUCTURAL BODIES OR CAVITY-DEFINING WALLS WHICH MAY BE SUBJECT TO CRACKING

BACKGROUND OF THE INVENTION

1. Field of the Invention

This invention relates to a process for sealing structural bodies or cavity-defining walls which may be subject to cracking, wherein a sealing material is applied to outside surfaces of a body or wall.

2. Description of the Prior Art

When a reactor part, for example, which is encapsulated in a shell of reinforced concrete has been provided with sealing and radiation-shielding materials such as by a process as described in German Patent Specification No. 28 54 330, a problem may arise in that heat is dissipated by the reactor as a result of nuclear reactions. Such heat can produce expansion and, subsequent cooling, and shrinkage of the shell in which the reactor is encapsulated so that cracks may form in the shell and establish undesired communication channels for liquid to leak into the environment. Cracks may also form in the walls of containers in regions subject to earthquakes. Containers which are used to store hazardous waste material or other hazardous materials and which have walls in which cracks may form as a result of thermal stresses or other influences, may thus have to be protected in such a manner that fluids, particularly liquids cannot leak out or in through such cracks.

Expansion and shrinkage which result in cracks may also occur in massive concrete structures, e.g., masonry dams, and such cracks may also give rise to sealing problems.

It is known to provide so-called adhesive seals on walls which are liable to crack. But such adhesive seals cannot ensure an adequate seal for a long time period because cracks may form in such seals or the seals may detach from the wall with the formation of gaps and/or cavities, into which water or other undesired fluids can enter. Specifically, an adhesive seal will not resist aggressive fluids because copper or aluminum foil, for example, which is commonly used in contact with such fluids may be dissolved. Moreover, dependent on which side of a wall such adhesive seals are provided, they will resist only water pressure on one side rather than liquid pressure applied from both sides, because pressure applied to the adhesive-covered side of the adhesive seal would tend to detach the seal.

SUMMARY OF THE INVENTION

It is an object of the invention to provide a process by which cracks which have formed in structural bodies or in cavity-defining or container walls can be sealed with high reliability in such a manner that substances or gases cannot leak out or in through such walls.

In accordance with the invention the structural body or cavity-defining wall is surrounded or enclosed by enclosing walls which are spaced from the body or the cavity-defining wall and a flowable sealing fluid of high viscosity is filled into the annular space or enclosing jacket space thus formed. The fluid which is used in the process is under a certain hydrostatic pressure, which preferably can be increased in that a secondary fluid is preferably retained in a space disposed above said annular space or jacket space. Any crack which may have formed in the wall or surface which is to be protected will be filled and closed by a supply of the secondary fluid. The viscosity of the flowable sealing fluid is preferably so selected that its rate of flow exceeds the expected rate of volume change of the annular space. For example, if the rate of flow of the fluid exceeds the rate of shrinkage of the wall or body to be protected, any crack resulting from such shrinkage will be filled substantially immediately.

In accordance with a further feature of the invention, the annular or jacket space may be filled with broken stone, chippings or a mixture of chippings and broken stone and the voids left in the skeleton of broken stone filled with the flowable sealing fluid. Pressure applied to the walls which define the annular or jacket space can be transferred from one wall to the other by the mineral skeleton so that the inventive process provides a pressure-transmitting self-sealing seal which will follow any deformation caused by volume changes or thermally induced movements and will immediately close any crack formed in the boundary walls.

The broken stone may be mixed with the flowable fluid and the resulting mixture may be introduced into the annular space. Dependent on the viscosity of the sealing liquid, the voids defined by the broken stone, chippings, or mixture of chippings and broken stone should be large enough for a sufficiently fast flow to be provided. When liquids having a very low viscosity are used, a so-called slippable granular material, such as sand or fine chippings, may be added to the broken stone, or the mixture of chippings and broken stone so that less liquid will be required, while the flowability of the liquid which fills all cavities in the mixture will not be adversely affected and the sealing effect provide in accordance with the invention will not be eliminated.

Wetting agents or adhesion-promoting agents may be added to the liquid to facilitate its ingress into any crack formed in the boundary walls. On principle, the hydraulic pressure applied by the sealing liquid should exceed the pressure which is applied to the container or to the exterior wall. The density of the sealing liquid may be increased by an addition of suitable fillers.

The walls which form an outer enclosure may be constituted by the boundary surfaces of building pits.

The annular or jacket space may be disposed, for example, between spaced apart bodies, blocks or containers.

The walls of the exterior enclosure may consist of reinforced concrete.

The flowable fluid may consist of a Newtonian fluid or a non-Newtonian fluid, Maxwellian fluid or Burgerian fluid. Liquids or resins should be used which are unchanged to the smallest possible degree in their material properties. The rheological properties may be changed in that mineral fillers, such as rock flour, may be added to and dispersed in the liquid. A liquid which has such material properties and can be used economically is bitumen or mastic to which mineral fillers have been added.

In order to ensure a good filling of the annular space or jacket space, the flowable fluid is preferably introduced so as to rise from below. A lance or the like may be used to introduce the fluid.

Where liquids having a temperature-dependent viscosity are used, the flowability of the fluid or of the mastic may be increased by means of heating conductors, such as metal rods, which are installed in the annular or jacket space.

The thickness of the annular or jacket space may be at least 10 centimeters.

By the selection of a suitable viscosity of bituminous binder, the mastic may be adjusted to have such a viscosity, that under the temperature conditions to which the surfaces or walls to be protected may be exposed, the mastic will be sufficiently flowable to ensure the application of a sufficiently high liquid pressure to the surfaces to be protected, and to ensure that the mastic or liquid can flow up and fill any voids produced when cracks have formed.

DETAILED DESCRIPTION OF PREFERRED EMBODIMENTS

The drawings show a cylindrical wall of reinforced concrete in which the reactor part of a nuclear power plant is encapsulated, and which is surrounded by a spaced second cylindrical wall of reinforced concrete. The annular space between the walls is filled with broken stone and a bituminous mastic.

Figure 1:
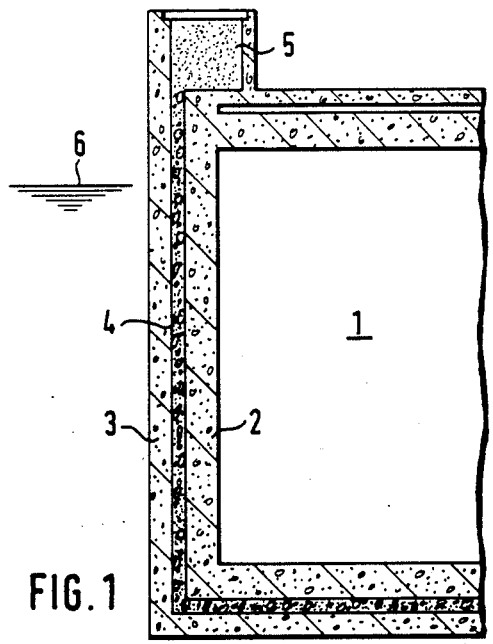
FIG. 1 is a diagrammatic transverse sectional view of a container installed in the ground.
Figure 2:
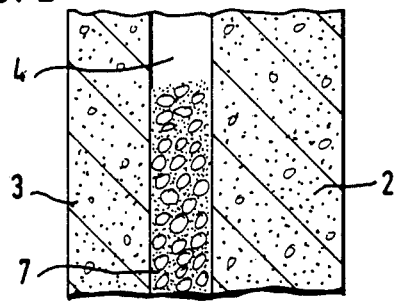
FIG. 2 is an enlarged transverse sectional view of the container wall and an enclosing wall which define an annular space therebetween.

FIG. 1 is a diagrammatic illustration of a container 1, which has a side wall 2, which may be cylindrical, and which is surrounded by a spaced apart outer shell 3, which consists, for example, of reinforced concrete. An annular space 4 is defined between the container wall 2 and the enclosing outer shell 3 and is filled with a skeleton 7 of broken stone. The voids defined in the broken stone are filled with a mixture of bitumen and rock meal.

The container 1 and the outer shell 3 are installed in the ground. The ground water level 6 may be disposed in the upper region of the exterior shell. The container 1 and the enclosing exterior shell may be provided with bottom walls, which also define a gap therebetween, filled with a mixture of broken stone or of broken stone and chippings, on the one hand, and of bitumen and rock flour, on the other hand.

The annular space 4 is connected in to a supply container 5, which is filled with a sealing fluid consisting, for example, only of bitumen, or of bitumen and a filler.

The annular space 4 and the gap between the bottom walls may be filled, for example, with the following materials or mixtures:
1. Bitumen
2. 60% by weight bitumen 80
   40% by weight rock flour 0 to 0.06 mm
3. 75% broken stone 35 to 45 mm
   25% bitumen 65
4. 70% broken stone 35 to 45 mm
   10% rock flour 0 to 0.06 mm
   20% bitumen 80
5. 65% broken stone 35 to 45 mm
   10% sand 0.6 to 2 mm
   10% rock flour 0 to 0.09 mm
   15% bitumen 200

In all mixtures stated above, the sealing fluid consists of bitumen or of bitumen and rock flour.

What is claimed:
1. A method of sealing a structural body, cavity-defining wall or other structure which may crack, wherein a sealing material is applied to an outside surface of the structure comprising
   enclosing the structure with an enclosing wall spaced from the structure, initially filling a space formed between the structure and the enclosing wall with a filler of broken stone, chippings or a mixture of chippings and broken stone, and
   introducing a flowable sealing fluid having a high viscosity into the space formed between the structure and the enclosing wall and into voids left in the filler for transferring pressure applied to the walls which define the space from one wall to the other by the filler so that a pressure-transmitting, self-sealing seal is formed which will follow any deformation caused by volume changes or thermally induced movements and which will immediately close any crack formed by the walls defining the space.

2. A method according to claim 2, characterized in that the fluid comprises a mixture which consists of broken stone or of broken stone and chippings, on the one hand, and of bitumen and rock flour, on the other hand.

3. A method according to claim 2, characterized in that the mixture includes sand as a slippery granular material.

4. A method according to claim 1, wherein the structure is a building pit.

5. A method according to claim 1, wherein said space is defined by spaced apart bodies, blocks or containers.

6. A method according to claim 1, wherein the enclosing wall is made of reinforced concrete.

7. A method according to claim 1, wherein the fluid is a mastic consisting of bitumen and additives.

8. A method according to claim 1, wherein the fluid is introduced into said space to rise therein from the bottom of the space.

9. A method according to claim 1, wherein a secondary fluid is stored above said space in such manner that the secondary fluid applies a hydrostatic pressure to the fluid contained in said space.

10. A structural body, cavity defining wall or other structure which is sealed by an enclosing wall defining a space between the structure and the wall, with a flowable high-viscosity sealing fluid contained in said space and said space containing granular material and the fluid filling voids in the granular material for transferring pressure applied to the walls which define the space from one wall to the other by the filler so that a pressure-transmitting, self-sealing seal is formed which will follow any deformation caused by volume changes or thermally induced movements and which will immediately close any crack formed by the walls defining the space.

11. A structure as claimed in claim 10, wherein the fluid is a mastic comprising bitumen and additives.

12. A structure as defined in claim 10, which includes a reservoir above said space containing the fluid.

13. A structure as defined in claim 10, wherein the structure is at least partially buried in the ground.

* * * * *